(12) United States Patent
Zou

(10) Patent No.: US 11,644,181 B1
(45) Date of Patent: May 9, 2023

(54) LAMP HEAD STRUCTURE, BULB LAMP AND LAMP STRING

(71) Applicant: DONGGUAN TUOYING PHOTOELECTRIC TECHNOLOGY CO., LTD., Dongguan (CN)

(72) Inventor: Huisheng Zou, Dongguan (CN)

(73) Assignee: DONGGUAN TUOYING PHOTOELECTRIC TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/533,138

(22) Filed: Nov. 23, 2021

(30) Foreign Application Priority Data

Nov. 3, 2021 (CN) .......................... 202122680947.X

(51) Int. Cl.
| | |
|---|---|
| *F21S 4/10* | (2016.01) |
| *F21V 17/08* | (2006.01) |
| *F21V 17/16* | (2006.01) |
| *F21V 17/00* | (2006.01) |
| *F21V 19/00* | (2006.01) |
| *F21V 8/00* | (2006.01) |

(52) U.S. Cl.
CPC ................ *F21V 17/08* (2013.01); *F21S 4/10* (2016.01); *F21V 17/002* (2013.01); *F21V 17/16* (2013.01); *F21V 19/0025* (2013.01); *G02B 6/0005* (2013.01)

(58) Field of Classification Search
CPC ....................................................... F21S 4/10
See application file for complete search history.

(56) References Cited

U.S. PATENT DOCUMENTS

| | | | |
|---|---|---|---|
| 6,176,600 B1* | 1/2001 | Huang ...................... | F21S 4/10 362/396 |
| 2014/0126211 A1* | 5/2014 | Chiang ................ | F21V 23/005 362/249.16 |

* cited by examiner

*Primary Examiner* — Sean P Gramling

(57) ABSTRACT

The present disclosure provides a lamp head structure. The lamp head structure includes: a seat body having a hollow space, a top opening and a bottom opening communicating with the hollow space; and a connection member, detachably connected to the seat body at the top opening. The connection member and the seat body cooperatively define a wire inlet hole and a wire outlet hole, the wire inlet hole and the wire outlet hole communicating to the hollow space. The present disclosure provides a bulb lamp and a lamp string. The lamp head structure, the bulb lamp, and the lamp string each has a simplified structure and a low cost, and may be easily assembled.

11 Claims, 5 Drawing Sheets

US 11,644,181 B1

LAMP HEAD STRUCTURE, BULB LAMP AND LAMP STRING

TECHNICAL FIELD

The present disclosure relates to the field of illumination apparatuses, and in particular to a lamp head structure, a bulb lamp and a lamp string.

BACKGROUND

As the Light Emitting Diode (LED) technology develops rapidly, the LED itself is small-sized, has low power consumption, long service life and high brightness, and is environmentally friendly. Therefore, the LED has been widely used in the illumination industry and is especially taken as a lamp string of light decoration. Traditionally, a basic structure of a bulb lamp is made by providing a plurality of electro-luminescent semiconductive chips, solidifying silver glue or white glue into a lamp core, connecting the lamp core to a wire, and providing a lamp cover to cover the lamp core.

In an application scenario of the bulb lamp, a plurality of bulb lamps are connected in series to form a lamp string. Therefore, a lamp core of each of the plurality of bulb lamps is connected to an input wire and an output wire, such that the plurality of bulb lamps are connected to each other. However, in the art, each of the input wire and output wire needs to be electrically connected to a plug in order to provide power to the bulb lamp. Therefore, the lamp string formed by the plurality of bulb lamps may have a complicated connection structure and may not be assembled easily.

Therefore, the structure of the lamp string needs to be optimized to solve the above technical problem.

SUMMARY OF THE DISCLOSURE

The present disclosure provides a lamp head structure, a bulb lamp and a lamp string, such that the lamp string may have a simple structure, have a low cost and may be easily assembled.

According to a first aspect, a lamp head structure includes a seat body having a hollow space, a top opening and a bottom opening communicating with the hollow space; and a connection member, detachably connected to the seat body at the top opening; wherein, the connection member and the seat body cooperatively define a wire inlet hole and a wire outlet hole, the wire inlet hole and the wire outlet hole communicating to the hollow space.

According to a second aspect, a bulb lamp includes: the lamp head structure according to any one of the above embodiments; a lighting assembly, including an electric wire and a light-emitting chip arranged on the electric wire and electrically connected to the electric wire, the electric wire passing through the wire inlet hole and exposed to an outside via the wire outlet hole with the light-emitting chip received in the hollow space; and a light guide body, connected to the seat body at the bottom opening thereof for guiding light emitted by the light-emitting chip to the outside.

According to a third aspect, a lamp string includes a wire and a plurality of bulb lamps. The plurality of bulb lamps are connected to each other via the wire, and each of the plurality of bulb lamps may be referred to the bulb lamp according to any one of the above embodiments. The lighting assembly of the bulb lamp is electrically connected to and fixed to the wire. The wire extends through the hollow space of the lamp head structure through the wire inlet hole and the wire outlet hole of the lamp head structure of the bulb lamp, and the wire is clamped by the connection member and the seat body of the lamp head structure at the wire inlet hole and at the wire outlet hole.

According to the present disclosure, a lamp head structure, a bulb lamp and a lamp string are provided. A lamp bead may be disposed inside a seat body. A wire at each of two sides of the lamp bead is disposed between a connection member and the seat body. The connection member and the seat body are connected, such that the connection member and the seat body cooperatively define a wire inlet hole and a wire outlet hole. The wire is clamped by the connection member and the seat body at the wire inlet hole and at the wire outlet hole. In this way, the structure of the lamp string is simplified, and the lamp string has lower cost and may be easily assembled.

BRIEF DESCRIPTION OF THE DRAWINGS

Structures and corresponding reference numerals.

Figure 1:
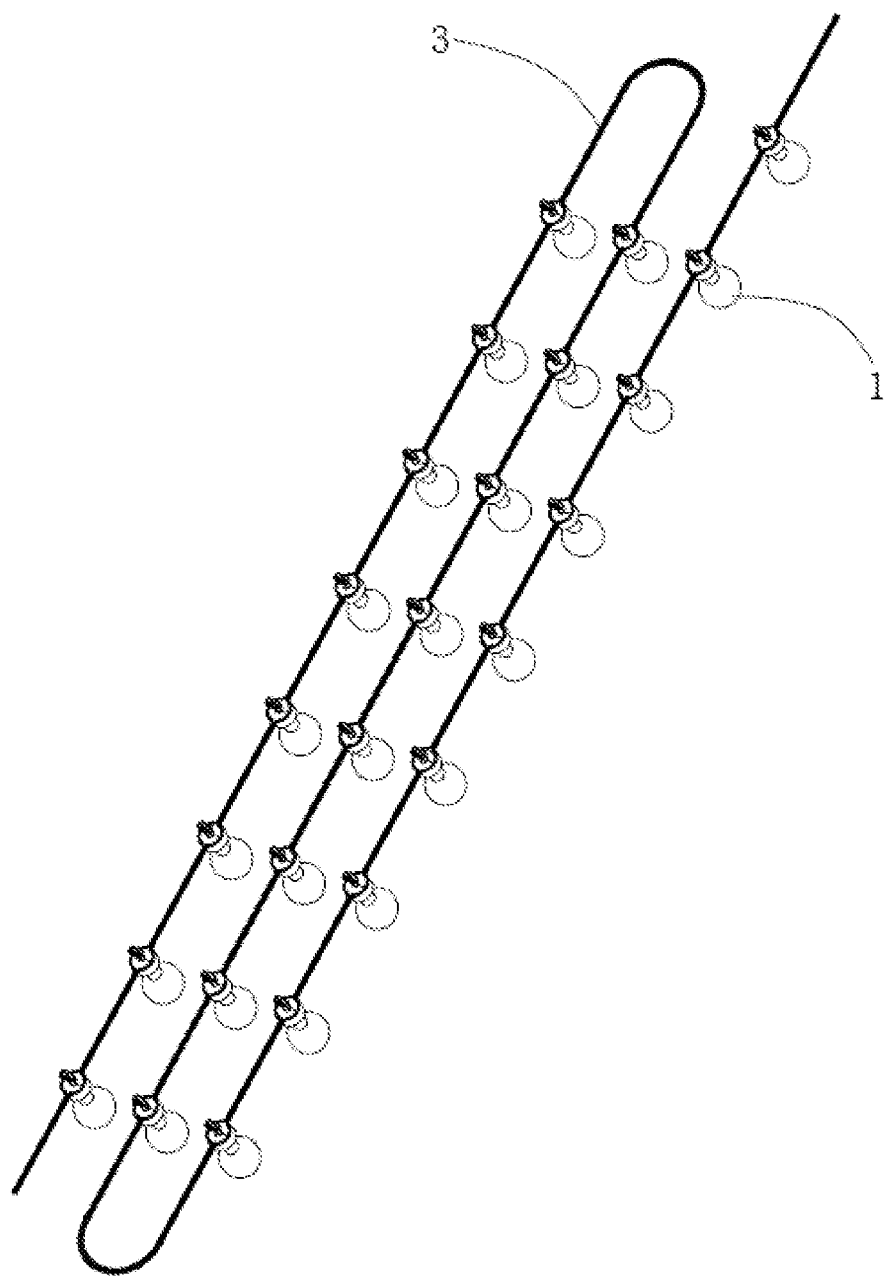
FIG. 1 is a structural schematic view of a lamp string according to an embodiment of the present disclosure.

1-bulb lamp; 5-lamp bead; 7-lamp head structure; 7A-hollow space; 7B-wire inlet hole; 7C-wire outlet hole; 71-seat body; 711-wire inlet groove; 713-wire outlet groove; 715-protrusion; 717-second engaging portion; 719-second engaging block; 73-connection member; 731-plate body; 733-first extension portion; 735-second extension portion; 737-engaging part; 739-hanger; 9-light guide body; 91-curve faced groove; 93-first engaging portion; 931-first engaging block; 3-wire.

DETAILED DESCRIPTION

Technical solutions of the embodiments of the present disclosure will be clearly and completely described by referring to accompanying drawings. Obviously, the embodiments are only a part, but not all, of the embodiments of the present disclosure. All other embodiments obtained by the ordinary skilled person art based on the embodiments of the present disclosure without making creative work shall be covered by the scope of the present disclosure.

As shown in FIGS. 1 to 5, the lamp string of the present disclosure includes a plurality of bulb lamps 1 and a wire 3 electrically connected to the plurality of bulb lamps 1. The wire 3 is a leather wire.

Each of the plurality of bulb lamps 1 includes a lamp bead 5, a lamp head structure 7 and a light guide body 9. The lamp bead 5 is electrically connected to the wire 3 and fixed to the wire 3. The lamp head structure 7 defines a hollow space 7A to receive the lamp bead 5. The light guide body 9 is connected to the lamp head structure 7.

The light bead 5 is a LED bead. For example, in an embodiment, the light bead 5 may be a LED illuminating chip which wraps and is fixed on the leather wire.

The lamp head structure 7 includes a seat body 71 and a connection member 73 that snaps to the seat body 71.

The seat body 71 includes a seat wall, and the seat wall defines a space and has an opening at a top of the seat body and another opening at a bottom of the seat body. The connection member 73 is detachably connected to the seat body 71 at the top opening of the seat body 71. The light guide body 9 is detachably connected to the seat body 71 at the bottom opening of the seat body 71.

The connection member 73 and the seat body 71 are connected and cooperatively define a wire inlet hole 7B and a wire outlet hole 7C. The wire 3 extends through the hollow space 7A via the wire inlet hole 7B and the wire outlet hole 7C. That is, the wire inlet hole 7B and the wire outlet hole 7C are communicated to the hollow space 7A. The wire 3 is clamped by the connection member 73 and the seat body 71 at both the wire inlet hole 7B and the wire outlet hole 7C.

Figure 2:
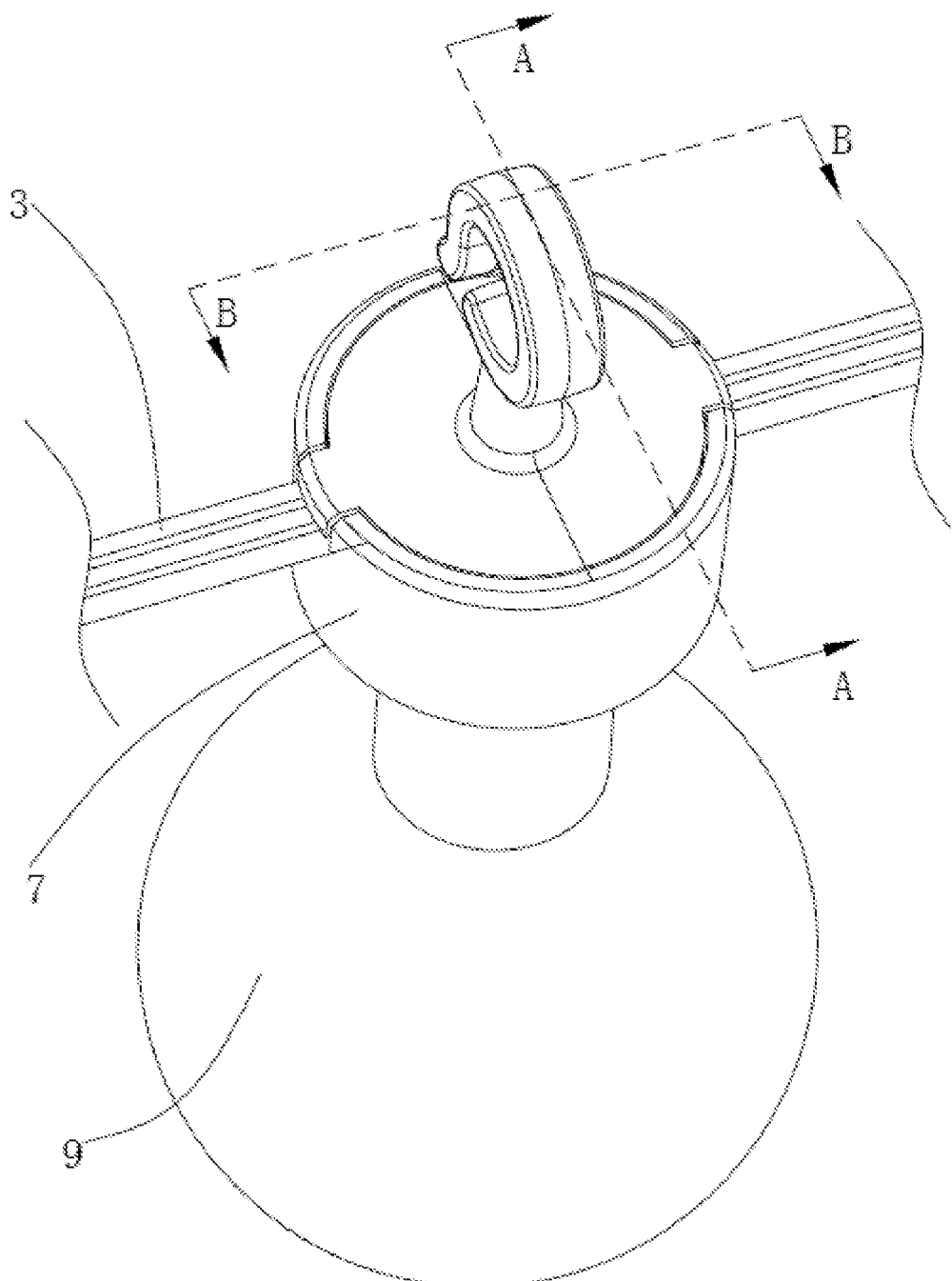
FIG. 2 is a structural schematic view of a portion of the lamp string shown in FIG. 1.
Figure 4:
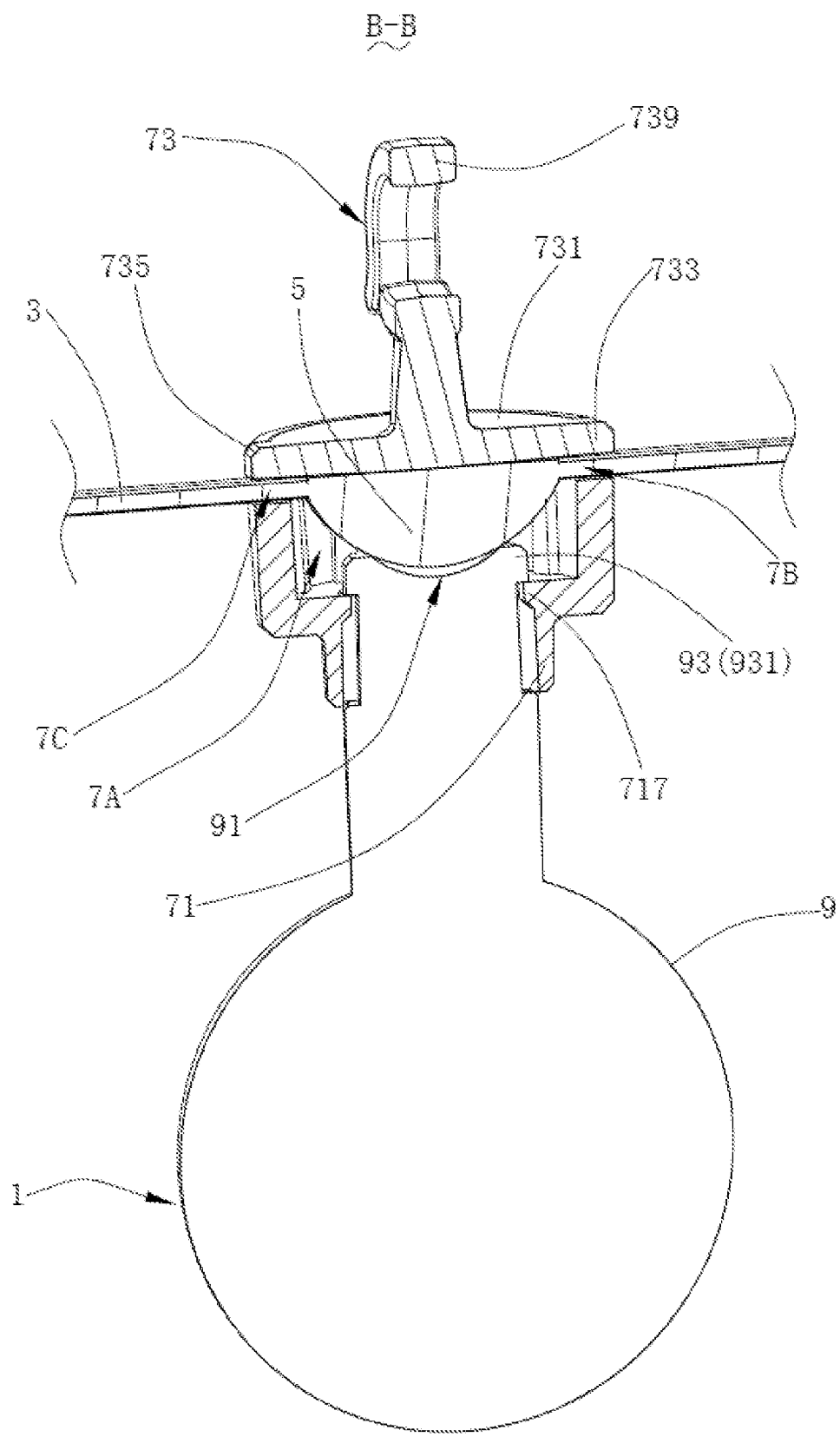
FIG. 4 is a cross section view of the portion shown in FIG. 2, taken along a line B-B.
Figure 5:
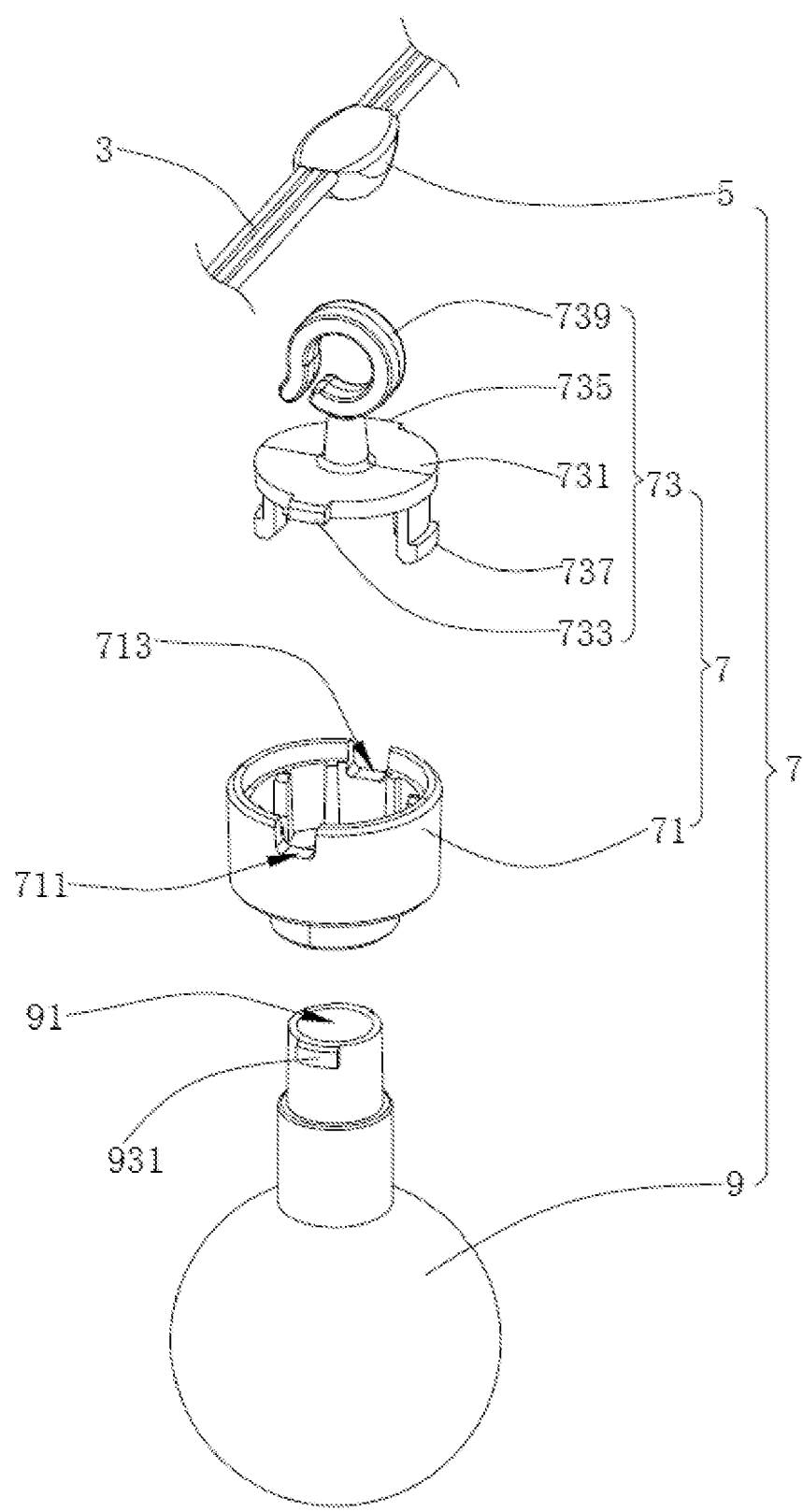
FIG. 5 is a perspective view of the portion shown in FIG. 2.

As shown in FIG. 2, FIG. 4, and FIG. 5, the seat wall of the seat body 71 has a certain thickness. Each of the wire inlet hole 7B and the wire outlet hole 7C extends through the thickness of the seat wall. A center line of the wire inlet hole 7B along a thickness direction of the seat wall coincides with a center line of the wire outlet hole 7C along the thickness direction of the seat wall. In this way, the wire 3 may not be bent or curved after extending through the bulb lamp 1.

Figure 3:
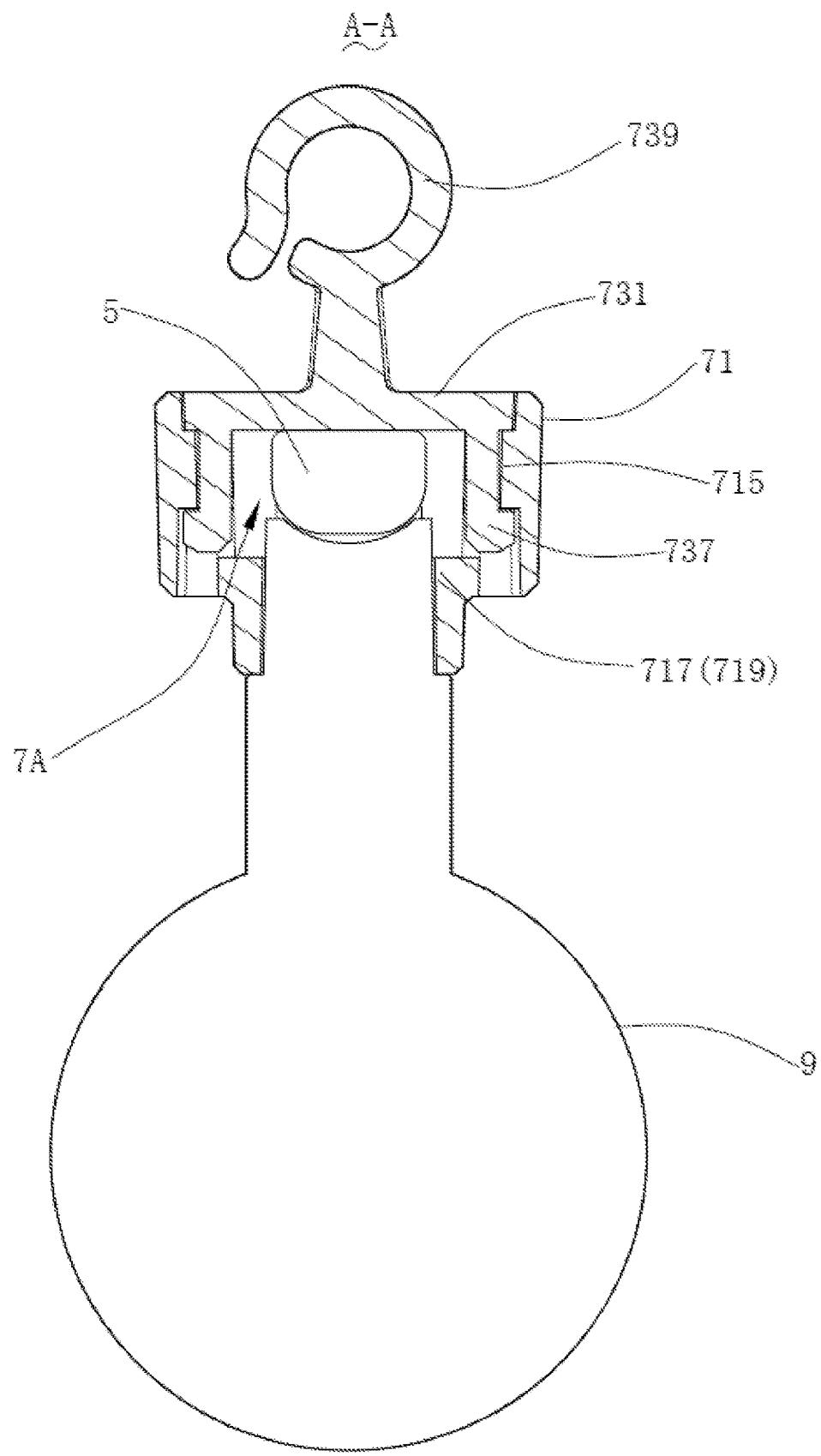
FIG. 3 is a cross section view of the portion shown in FIG. 2, taken along a line A-A.

As shown in FIG. 3, FIG. 4, and FIG. 5, the top opening of the seat body 71 defines a wire inlet groove 711 and a wire outlet groove 713. An inner wall of the seat body 71 is configured with a protrusion 715. The connection member 73 includes a plate body 731, a first extension portion 733 extending from the plate body 731, a second extension portion 735 and an elastic engaging part 737. The first extension portion 733 is inserted into the wire inlet groove 711 to form the wire inlet hole 7B. The wire 3 is clamped by the first extension portion 733 and the seat body 71 at the wire inlet hole 7B. The second extension portion 735 is inserted into the wire outlet groove 713 to form the wire outlet hole 7C. The wire 3 is clamped by the second extension portion 735 and the seat body 71 at the wire outlet groove 713. The elastic engaging part 737 is inserted into the seat body 71 and fastened to the protrusion 715. The plate body 731 abuts against the protrusion 715.

While assembling the lamp string, the lamp bead 5 is disposed inside the seat body 71, i.e., received in the space of the seat body 71. A wire on each of two sides of the lamp bead 5 is received in the wire inlet groove 711 and wire outlet groove 713. In some embodiments, the light bead may be a lighting assembly, including an electric wire and a light-emitting chip arranged on the electric wire and electrically connected to the electric wire. The electric wire passes through the wire inlet hole and exposed to an outside via the wire outlet hole with the light-emitting chip received in the hollow space. The elastic engaging part 737 of the connection member 73 is inserted into the seat body 71 to allow the elastic engaging part 737 to fasten to the protrusion 715 and to allow the plate body 731 to abut against the protrusion 715. That is, the connection member 73 is fastened to the seat body 71. At the same time, while the elastic engaging part 737 is fastened to the protrusion 715, the first extension portion 733 is inserted into the wire inlet groove 711 to form the wire inlet hole 7B, and the second extension portion 735 is inserted into the wire outlet groove 713 to form the wire outlet hole 7C. The wire 3 is clamped by the first extension portion 733 and the seat body 71 at the wire inlet hole 7B and at the wire outlet groove 713. The light guide body 9 and the seat body 71 may be connected in advance. Alternatively, the light guide body 9 may be connected to the seat body 71 after the connection member 73 is connected to the seat body 71. In this way, the lamp string has a simplified structure, has a lower cost, and may be easily assembled.

It shall be understood that, in other embodiments, a portion of the wire inlet groove 711 is defined in the first extension portion 733, and the rest portion of the wire inlet groove 711 is defined in the seat body 71. Similarly, a portion of the wire outlet groove 713 is defined in the second extension portion 735, and the rest portion of the wire outlet groove 713 is defined in the seat body 71.

As shown in FIGS. 2-5, the connection member 73 further includes a hanger 739 connected to the plate body 731, and the hanger 739 is configured to hang and fix the lamp string.

As shown in FIG. 3 and FIG. 5, two elastic engaging parts 737 are arranged. The two elastic engaging parts 737 are spaced apart from each other. The protrusion 715 is circular. It shall be understood that, in other embodiments, more than two elastic engaging parts 737 may be arranged, such as three, four, and so on. The more the elastic engaging parts 737 are arranged, the more reliable the connection between the connection member 73 and the seat body 71 is. Correspondingly, the protrusion 715 may include a plurality of small sized protrusion spaced apart from each other.

As shown in FIG. 4, the light guide body 9 is inserted into the seat body 71 to connect to the seat body 7. Further, the wire 3 abuts against the connection member 73, and the light bead 5 abuts against the light guide body 9.

As shown in FIG. 3 and FIG. 4, the light guide body 9 defines a curved groove 91, and a wall of the curved groove 91 abuts against the light bead 5. The light bead 5 is partially received in the curved groove 91. In this way, the light guide body 9 may limit movement of the lamp bead 5, such that the lamp bead 5 is more stably arranged in the lamp head structure 7. In addition, the light guide body 9 may guide light emitted from the lamp bead 5 to an outside of the lamp more effectively.

The light guide body 9 and the seat body 71 may be fixedly or detachably connected. In the present embodiment, the light guide body 9 is detachably connected to the seat body 71, such that the light guide body 9 and the seat body 71 may be easily replaced for maintenance. The light guide body 9 may be made of transparent acrylic material.

Detachable connection may be connection through a screw or a snap. It should be noted that the detachable connection is determined by the ordinary skilled person in the art according to the actual demands, and is not limited to the above-mentioned screw connection or snap connection, which is listed as an example only.

In the present embodiment, the light guide body 9 is fastened to the seat body 71. As shown in FIG. 4, an outer wall of the light guide body 9 is arranged with a first engaging portion 93, and the inner wall of the seat body 71 is arranged with a second engaging portion 717. The second engaging portion 717 is fastened to the first engaging portion 93.

As shown in FIG. 4 and FIG. 5, the first engaging portion 93 includes two first engaging blocks 931 that are spaced apart from each other. The second engaging portion 717 includes two second engaging blocks 719 that are spaced apart from each other. The two first engaging blocks 931 are fastened to the two second engaging blocks 719. One of the two second engaging blocks 719 is be inserted between the two first engaging blocks 931, and one of the two first engaging blocks 931 is be inserted between the two second engaging blocks 719. While assembling, the light guide body 9 is inserted into the seat body 71, and the light guide body 9 is rotated relative to the seat body 71 to allow the first engaging block 931 to fasten to the second engaging block 719. In this way, the fasten connection prevents the light guide body 9 from being deformed or even broken while the light guide body 9 is being connected.

It shall be understood that, in other embodiments, the first engaging portion 93 may include more than two first engaging blocks 931, such as three, four, and so on. The more than two first engaging blocks 931 are equally spaced apart from each other. The second engaging portion 717 may include more than two second engaging blocks 719, such as three, four, and so on. The more than two second engaging blocks 719 are equally spaced apart from each other. One of the second engaging blocks 719 may be inserted between two adjacent first engaging blocks 931, and one of the first engaging blocks 931 may be inserted between two adjacent second engaging blocks 719.

The above shows only the embodiments of the present disclosure. To be noted that, for the ordinary skilled person in the art, improvements may be made without departing from the concept of the present disclosure, and the improvements shall be included in the scope of the present disclosure.

What is claimed is:

1. A bulb lamp, comprising:
   a lamp head structure, comprising:
      a seat body having a hollow space, a top opening and a bottom opening communicating with the hollow space; and
      a connection member, detachably connected to the seat body at the top opening;
   wherein the connection member and the seat body cooperatively define a wire inlet hole and a wire outlet hole, the wire inlet hole and the wire outlet hole communicating to the hollow space;
   a lighting assembly, comprising an electric wire and a light-emitting chip arranged on the electric wire and electrically connected to the electric wire, the electric wire passing through the wire inlet hole and exposed to an outside via the wire outlet hole with the light-emitting chip received in the hollow space; and
   a light guide body, connected to the seat body at the bottom opening thereof for guiding light emitted by the light-emitting chip to the outside, the light guide body is detachably connected to the seat body, the light guide body is arranged with a first engaging portion, and the seat body is arranged with a second engaging portion, the first engaging portion comprises at least two first engaging blocks, the at least two first engaging blocks are spaced apart from each other; the second engaging portion comprises at least two second engaging blocks, the at least two second engaging blocks are spaced apart from each other; the at least two first engaging blocks are fastened to the at least two second engaging blocks; one of the at least two second engaging blocks is disposed between two adjacent ones of the at least two first engaging blocks, one of the at least two first engaging blocks is disposed between two adjacent ones of the at least two second engaging blocks.

2. The bulb lamp according to claim 1, wherein the seat body defines a wire inlet groove and a wire outlet groove at the top opening;
   the connection member comprises a plate body, a first extension portion extending from the plate body, and a second extension portion extending from the plate body, the first extension portion and the second extension portion extending in opposite direction; the first extension portion is inserted into the wire inlet groove to form the wire inlet hole, the second extension portion is inserted into the wire outlet groove to form the wire outlet hole.

3. The bulb lamp according to claim 2, wherein,
   the seat body has a protrusion protruded toward the hollow space;
   the connection member further comprises an elastic engaging part engaging with the protrusion while the plate body abuts against the protrusion.

4. The bulb lamp according to claim 2, wherein the elastic engaging part comprises at least two elastic engaging portions, and the at least two engaging portions are spaced apart from each other, and the protrusion is arranged around the seat body.

5. The bulb lamp according to claim 1, wherein the seat body has a seat wall, each of the wire inlet hole and the wire outlet hole extends through a thickness of the seat wall, a center line of the wire inlet hole along a thickness direction of the seat wall coincides with a center line of the wire outlet hole along the thickness direction of the seat wall.

6. The bulb lamp according to claim 1, wherein the light guide body is inserted into the seat body to connect to the seat body, and the lighting assembly abuts against the light guide body.

7. The bulb lamp according to claim 6, wherein the light guide body has a curved groove, a wall of the curved groove abuts against the lighting assembly, and the lighting assembly is partially received in the curved groove.

8. The bulb lamp according to claim 1, wherein the light guide body is fastened to the seat body.

9. The bulb lamp according to claim 8, wherein an outer wall of the light guide body is arranged with the first engaging portion, and an inner wall of the seat body is arranged with the second engaging portion, the second engaging portion is fastened to the first engaging portion.

10. A lamp string, comprising a wire and a plurality of bulb lamps, wherein
    the plurality of bulb lamps are connected to each other via the wire;
    each of the plurality of bulb lamps comprises:
       a lamp head structure, comprising:
          a seat body having a hollow space, a top opening and a bottom opening communicating with the hollow space; and
          a connection member, detachably connected to the seat body at the top opening;
       wherein the connection member and the seat body cooperatively define a wire inlet hole and a wire outlet hole, the wire inlet hole and the wire outlet hole communicating to the hollow space;
       a lighting assembly, comprising an electric wire and a light-emitting chip arranged on the electric wire and electrically connected to the electric wire, the electric wire passing through the wire inlet hole and exposed to an outside via the wire outlet hole with the light-emitting chip received in the hollow space; and
       a light guide body, connected to the seat body at the bottom opening thereof for guiding light emitted by the light-emitting chip to the outside;
    wherein the lighting assembly of the bulb lamp is electrically connected to and fixed to the wire;
       the wire extends through the hollow space of the lamp head structure through the wire inlet hole and the wire outlet hole of the lamp head structure of the bulb lamp, and the wire is clamped by the connection member and the seat body of the lamp head structure at the wire inlet hole and at the wire outlet hole, the light guide body is detachably connected to the seat body, the light guide body is arranged with a first engaging portion, and the seat body is arranged with a second engaging portion, the first engaging portion comprises at least two first engaging blocks, the at least two first engaging blocks are spaced apart from each other; the second engaging portion comprises at least two second engaging blocks, the at least two second engaging blocks are spaced apart from each other; the at least two first engaging blocks are fastened to the at least two second engaging blocks; one of the at least two second engaging blocks is disposed between two adjacent ones of the at least two first engaging blocks, one of the at least two first engaging blocks is disposed between two adjacent ones of the at least two second engaging blocks.

11. The lamp string according to claim 10, wherein the wire abuts against the connection member.

* * * * *